US012745132B2

(12) United States Patent
Tripathi

(10) Patent No.: US 12,745,132 B2
(45) Date of Patent: Sep. 22, 2026

(54) APPARATUS AND METHOD FOR OPTIMIZING UPLINK CARRIER AGGREGATION IN A RADIO ACCESS NETWORK

(71) Applicant: RAKUTEN MOBILE, INC., Tokyo (JP)

(72) Inventor: Sandeep Mani Tripathi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 634 days.

(21) Appl. No.: 17/923,498

(22) PCT Filed: Sep. 13, 2022

(86) PCT No.: PCT/US2022/043271

§ 371 (c)(1),
(2) Date: Nov. 4, 2022

(87) PCT Pub. No.: WO2024/058770

PCT Pub. Date: Mar. 21, 2024

(65) Prior Publication Data

US 2024/0306035 A1 Sep. 12, 2024

(51) Int. Cl.
*H04W 28/06* (2009.01)
*H04L 1/20* (2006.01)
(Continued)

(52) U.S. Cl.
CPC ............... *H04W 28/06* (2013.01); *H04L 1/20* (2013.01); *H04W 28/04* (2013.01); *H04W 52/365* (2013.01)

(58) Field of Classification Search
CPC ... H04W 28/06; H04W 28/04; H04W 52/365; H04L 1/20
See application file for complete search history.

(56) References Cited

U.S. PATENT DOCUMENTS 8,406,255 B2 * 3/2013 Ozturk .................. H04L 1/1883 370/468
2020/0100192 A1 * 3/2020 Rao ..................... H04W 52/247
(Continued)

FOREIGN PATENT DOCUMENTS

WO WO-2017162005 A1 * 9/2017 ............ H04W 52/14

OTHER PUBLICATIONS

International Search Report dated Jan. 31, 2023 in International Application No. PCT/US22/43271.
(Continued)

*Primary Examiner* — Sujoy K Kundu
*Assistant Examiner* — Andrew Chanul Kim
(74) *Attorney, Agent, or Firm* — Sughrue Mion, PLLC

(57) ABSTRACT

An apparatus and method for optimizing an uplink carrier aggregation in a radio access network (RAN) are provided. The apparatus includes a memory storing instructions, and at least one processor configured to execute the instructions to determine whether uplink data to be sent by a user equipment exceeds a first threshold; determine whether an available power at the user equipment exceeds a second threshold, wherein the second threshold is determined based on a variable offset value; and activate uplink carrier aggregation for the user equipment based on the uplink data to be sent being determined to exceed the first threshold and the power available at the user equipment being determined to exceed the second threshold.

20 Claims, 8 Drawing Sheets

(51) Int. Cl.
*H04W 28/04* (2009.01)
*H04W 52/36* (2009.01)

(56) References Cited

U.S. PATENT DOCUMENTS

2020/0389848 A1* 12/2020 Ji ............................ H04L 1/203
2022/0408375 A1* 12/2022 Shin .................... H04W 52/241
2023/0276296 A1* 8/2023 Kim ........................ H04L 5/001
2024/0422575 A1* 12/2024 Wu ............... H04W 36/008355

OTHER PUBLICATIONS

Written Opinion dated Jan. 31, 2023 in International Application No. PCT/US22/43271.

* cited by examiner

START
DOES CELL SUPPORT 5G UL CC? 301
YES
NO
DOES UE SUPPORT UL CA? 302
YES
NO
STOP
UE BSR > Data_BufferTh
YES
NO
UE PHR > PHRTH+PHROffset
YES
NO
ACTIVATE CA
DEACTIVATE CA
NO

APPARATUS AND METHOD FOR OPTIMIZING UPLINK CARRIER AGGREGATION IN A RADIO ACCESS NETWORK

CROSS REFERENCE TO RELATED APPLICATIONS

This application is a National Stage of International Application No. PCT/US2022/043271, filed Sep. 13, 2022.

TECHNICAL FIELD

Apparatuses and methods consistent with example embodiments of the present disclosure relate to the optimization of uplink carrier aggregation in a radio access network (RAN).

BACKGROUND

Carrier aggregation is a technique that is used in wireless communication to increase the data rate per user equipment (UE), whereby multiple component carriers are assigned to the same UE in order to support wider transmission bandwidths. Carrier aggregation has been introduced in the 3rd Generation Partnership Project ("3GPP") Release 10 (LTE-Advanced standard). Since carrier aggregation has been a provision in the 4G mobile standards and 5G mobile technology, network operators have been using carrier aggregation to provide faster speeds for UEs and/or higher network capacity. Carrier aggregation can be used in the FR1/FR2 operating bands of 5G mobile technology as well as in 4G LTE networks, depending on the specific UE capabilities.

In an uplink scenario, a UE's baseband capability is independent of the operating band. If the UE indicates baseband support, and if the UE indicates that it supports uplink carrier aggregation, uplink carrier aggregation can be activated based on an uplink buffer status (i.e., an uplink buffer status report (BSR)) from the UE and based on power available at the UE (i.e., a power headroom report (PHR)). For this purpose, in the related art, a base station (i.e., an eNB or a gNB) can decide whether to activate/deactivate uplink carrier aggregation based on the BSR report or based on a fixed PHR limit (i.e., a PHR constant) received from the UE.

According to the related art, uplink carrier aggregation activation/deactivation is always based on a fixed PHR limit. The fixed PHR limit may cause a frequent or unnecessary switching between an active state and a non-active state of the uplink carrier aggregation which reduces an uplink data throughput from the UE to the base station (i.e., an eNB or a gNB). Moreover, an uplink carrier aggregation activation based on a fixed PHR may result in inefficient uplink carrier aggregation power management which may result in a shorter battery life of the UE. Further, the related art does not consider network conditions and receiver sensitivity in determining whether to activate carrier aggregation.

SUMMARY

Aspects of one or more embodiments provide optimization of uplink carrier aggregation in a radio access network (RAN) by determining an uplink carrier aggregation activation/deactivation based on a variable offset value (i.e., an adaptive modification of a power threshold), wherein a modification of the variable offset value is based on a first block error rate (BLER) for a first uplink carrier of the activated uplink carrier aggregation and a second block error rate (BLER) for a second uplink carrier of an activated uplink carrier aggregation. As a result, in contrast to an uplink carrier aggregation activation/deactivation based on a fixed PHR limit (i.e., a constant value), the variable offset value as set forth above enables an advanced uplink carrier aggregation activation/deactivation algorithm that allows the UE to increase uplink data throughput and improve uplink carrier aggregation power management.

According to the embodiments, an apparatus for optimizing an uplink carrier aggregation in a radio access network (RAN), the apparatus includes: a memory storing instructions, and at least one processor configured to execute the instructions to: determine whether uplink data to be sent by a user equipment exceeds a first threshold; determine whether an available power at the user equipment exceeds a second threshold, wherein the second threshold is determined based on a variable offset value; and activate uplink carrier aggregation for the user equipment based on the uplink data to be sent being determined to exceed the first threshold and the power available at the user equipment being determined to exceed the second threshold.

The at least one processor may be configured to execute the instructions to: determine whether to modify the variable offset value based on a first block error rate (BLER) for a first uplink carrier of the activated uplink carrier aggregation and a second block error rate (BLER) for a second uplink carrier of the activated uplink carrier aggregation, wherein the second threshold is a sum of a predetermined fixed value and the variable offset value.

The at least one processor may be configured to execute the instructions to: determine whether the first BLER is less than or equal to a first BLER threshold; determine whether the second BLER is less than or equal to a second BLER threshold; and decrease the variable offset value based on the first BLER being determined to be less than or equal to the first BLER threshold and the second BLER being determined to be less than or equal to the second BLER threshold.

The at least one processor may be configured to execute the instructions to determine whether a combination of the first BLER and the second BLER is less than or equal to a third BLER threshold; and based on at least one of the first BLER being determined to be greater than the first BLER threshold or the second BLER being determined to be greater than the second BLER threshold, and based on the combination being determined to be less than or equal to the third BLER threshold, maintaining the variable offset value.

The at least one processor may be configured to execute the instructions to: based on the at least one of the first BLER being determined to be greater than the first BLER threshold or the second BLER being determined to be greater than the second BLER threshold, and based on the combination being determined to be greater than the third BLER threshold, increase the variable offset value.

The at least one processor may be configured to execute the instructions to: repeatedly determine whether to modify the variable offset value while the carrier aggregation is activated.

The at least one processor may be configured to execute the instructions to: repeatedly determine whether the uplink data to be sent by the user equipment exceeds the first threshold and whether the available power at the user equipment exceeds the second threshold are repeatedly performed while the carrier aggregation is activated, in order to determine whether to deactivate the carrier aggregation; and repeatedly determine whether the uplink data to be sent by the user equipment exceeds the first threshold and whether the available power at the user equipment exceeds the second threshold are repeatedly performed while the carrier aggregation is deactivated, in order to determine whether to activate the carrier aggregation.

According to the embodiments, a method for optimizing an uplink carrier aggregation in a radio access network (RAN), the method includes: determining whether uplink data to be sent by a user equipment exceeds a first threshold; determining whether an available power at the user equipment exceeds a second threshold, wherein the second threshold is determined based on a variable offset value; and activating uplink carrier aggregation for the user equipment based on the uplink data to be sent being determined to exceed the first threshold and the power available at the user equipment being determined to exceed the second threshold.

Determining whether to modify the variable offset value based on a first block error rate (BLER) for a first uplink carrier of the activated uplink carrier aggregation and a second block error rate (BLER) for a second uplink carrier of the activated uplink carrier aggregation, wherein the second threshold is a sum of a predetermined fixed value and the variable offset value.

Determining whether to modify the variable offset value may include: determining whether the first BLER is less than or equal to a first BLER threshold; determining whether the second BLER is less than or equal to a second BLER threshold; and decreasing the variable offset value based on the first BLER being determined to be less than or equal to the first BLER threshold and the second BLER being determined to be less than or equal to the second BLER threshold.

Determining whether to modify the variable offset value further may include: determining whether a combination of the first BLER and the second BLER is less than or equal to a third BLER threshold; and based on at least one of the first BLER being determined to be greater than the first BLER threshold or the second BLER being determined to be greater than the second BLER threshold, and based on the combination being determined to be less than or equal to the third BLER threshold, maintaining the variable offset value.

Determining whether to modify the variable offset value further may include: based on the at least one of the first BLER being determined to be greater than the first BLER threshold or the second BLER being determined to be greater than the second BLER threshold, and based on the combination being determined to be greater than the third BLER threshold, increasing the variable offset value.

Determining whether to modify the variable offset value is repeatedly performed while the carrier aggregation is activated.

The determining whether the uplink data to be sent by the user equipment exceeds the first threshold and the determining whether the available power at the user equipment exceeds the second threshold are repeatedly performed while the carrier aggregation is activated, in order to determine whether to deactivate the carrier aggregation; and the determining whether the uplink data to be sent by the user equipment exceeds the first threshold and the determining whether the available power at the user equipment exceeds the second threshold are repeatedly performed while the carrier aggregation is deactivated, in order to determine whether to activate the carrier aggregation.

According to the embodiments, a non-transitory computer readable recording medium having recorded thereon instructions executable by at least one processor to perform a method for optimizing an uplink carrier aggregation in a radio access network (RAN), the method includes: determining whether uplink data to be sent by a user equipment exceeds a first threshold; determining whether an available power at the user equipment exceeds a second threshold, wherein the second threshold is determined based on a variable offset value; and activating uplink carrier aggregation for the user equipment based on the uplink data to be sent being determined to exceed the first threshold and the power available at the user equipment being determined to exceed the second threshold.

Determining whether to modify the variable offset value based on a first block error rate (BLER) for a first uplink carrier of the activated uplink carrier aggregation and a second block error rate (BLER) for a second uplink carrier of the activated uplink carrier aggregation, wherein the second threshold is a sum of a predetermined fixed value and the variable offset value.

Determining whether the first BLER is less than or equal to a first BLER threshold, determining whether the second BLER is less than or equal to a second BLER threshold and decreasing the variable offset value based on the first BLER being determined to be less than or equal to the first BLER threshold and the second BLER being determined to be less than or equal to the second BLER threshold.

The determining whether to modify the variable offset value further may include: determining whether a combination of the first BLER and the second BLER is less than or equal to a third BLER threshold; and based on at least one of the first BLER being determined to be greater than the first BLER threshold or the second BLER being determined to be greater than the second BLER threshold, and based on the combination being determined to be less than or equal to the third BLER threshold, maintaining the variable offset value.

Based on the at least one of the first BLER being determined to be greater than the first BLER threshold or the second BLER being determined to be greater than the second BLER threshold, and based on the combination being determined to be greater than the third BLER threshold, increasing the variable offset value.

Determining whether to modify the variable offset value is repeatedly performed while the carrier aggregation is activated.

Determining whether the uplink data to be sent by the user equipment exceeds the first threshold and the determining whether the available power at the user equipment exceeds the second threshold are repeatedly performed while the carrier aggregation is activated, in order to determine whether to deactivate the carrier aggregation; and the determining whether the uplink data to be sent by the user equipment exceeds the first threshold and the determining whether the available power at the user equipment exceeds the second threshold are repeatedly performed while the carrier aggregation is deactivated, in order to determine whether to activate the carrier aggregation.

Additional aspects will be set forth in part in the description that follows and, in part, will be apparent from the description, or may be realized by practice of the presented embodiments of the disclosure.

BRIEF DESCRIPTION OF THE DRAWINGS

Aspects, features, and advantages of certain exemplary embodiments of the disclosure will be described below with reference to the accompanying drawings, in which like reference numerals denote like elements, and wherein.

DETAILED DESCRIPTION

Figure 1:
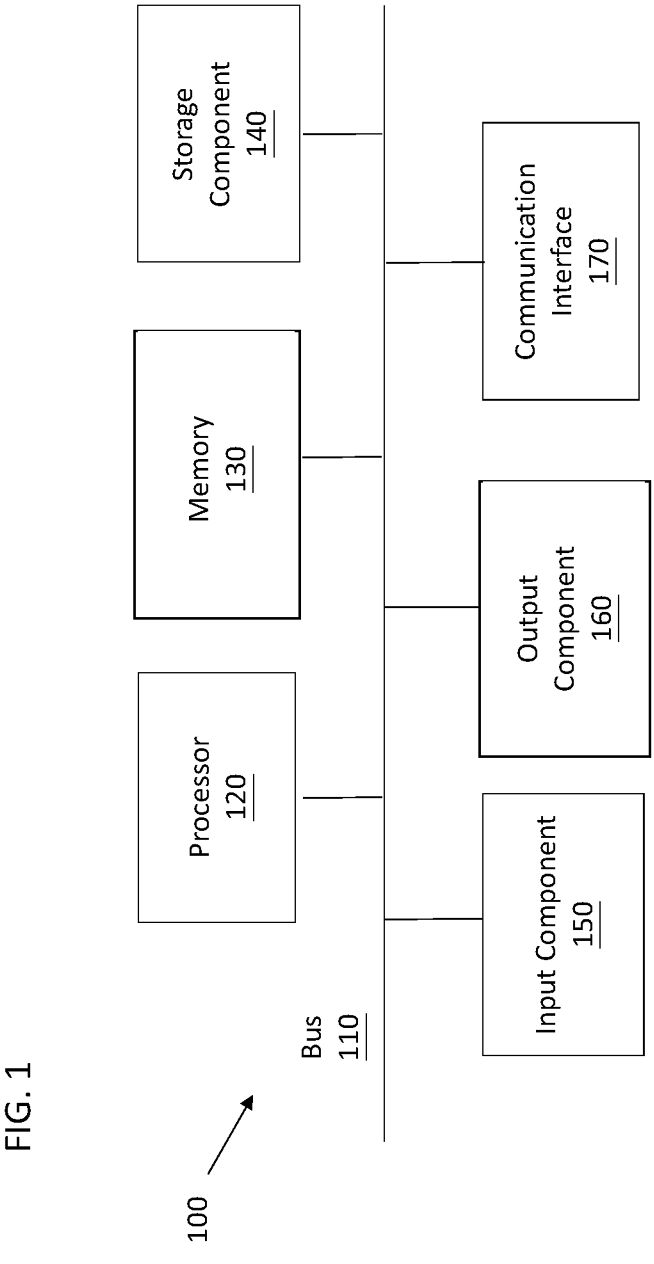
FIG. 1 is a diagram of example components of a device according to an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which a variable offset value is used to determine an uplink carrier aggregation activation/deactivation based on an adaptively modified threshold. This variable offset value is modified based on a first block error rate (BLER) for a first uplink carrier of the activated uplink carrier aggregation and a second block error rate (BLER) for a second uplink carrier of an activated uplink carrier aggregation. As a result, in contrast to a CA activation/deactivation based on a fixed PHR limit (i.e., a constant value), the variable offset value enables an advanced uplink carrier aggregation activation/deactivation algorithm that allows the UE to increase uplink data throughput and improve uplink carrier aggregation power management while reducing BLER.

FIG. 1 is a diagram of example components of a device 100. Device 100 may correspond to user device 110 and/or platform 120. As shown in FIG. 1, device 100 may include a bus 110, a processor 120, a memory 130, a storage component 140, an input component 150, an output component 160, and a communication interface 170.

Bus 110 includes a component that permits communication among the components of device 100. Processor 120 may be implemented in hardware, firmware, or a combination of hardware and software. Processor 120 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 120 includes one or more processors capable of being programmed to perform a function. Memory 130 includes a random access memory (RAM), a read only memory (ROM), and/or another type of dynamic or static storage device (e.g., a flash memory, a magnetic memory, and/or an optical memory) that stores information and/or instructions for use by processor 120.

Storage component 140 stores information and/or software related to the operation and use of device 100. For example, storage component 140 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 150 includes a component that permits device 100 to receive information, such as via user input (e.g., a touch screen display, a keyboard, a keypad, a mouse, a button, a switch, and/or a microphone). Additionally, or alternatively, input component 150 may include a sensor for sensing information (e.g., a global positioning system (GPS) component, an accelerometer, a gyroscope, and/or an actuator). Output component 160 includes a component that provides output information from device 100 (e.g., a display, a speaker, and/or one or more light-emitting diodes (LEDs)).

Communication interface 170 includes a transceiver-like component (e.g., a transceiver and/or a separate receiver and transmitter) that enables device 100 to communicate with other devices, such as via a wired connection, a wireless connection, or a combination of wired and wireless connections. Communication interface 170 may permit device 100 to receive information from another device and/or provide information to another device. For example, communication interface 170 may include an Ethernet interface, an optical interface, a coaxial interface, an infrared interface, a radio frequency (RF) interface, a universal serial bus (USB) interface, a Wi-Fi interface, a cellular network interface, or the like. Device 100 may perform one or more processes described herein. Device 100 may perform these processes in response to processor 120 executing software instructions stored by a non-transitory computer-readable medium, such as memory 130 and/or storage component 140. A computer-readable medium is defined herein as a non-transitory memory device. A memory device includes memory space within a single physical storage device or memory space spread across multiple physical storage devices.

Software instructions may be read into memory 130 and/or storage component 140 from another computer-readable medium or from another device via communication interface 170. When executed, software instructions stored in memory 130 and/or storage component 140 may cause processor 120 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 1 are provided as an example. In practice, device 100 may include additional components, fewer components, different components, or differently arranged components than those shown in FIG. 1. Additionally, or alternatively, a set of components (e.g., one or more components) of device 100 may perform one or more functions described as being performed by another set of components of device 100.

In embodiments, any one of the operations or processes of FIGS. 2 to 8 may be implemented by using any one of the elements illustrated in FIG. 1.

According to an example embodiment, a base station (e.g., an eNB or a gNB) of the radio network (RAN) is connected to a UE by a single component carrier (CC) (i.e., uplink carrier aggregation is deactivated by default). If the UE indicates that it supports uplink carrier aggregation, a base station can assign multiple component carriers (e.g., a first component carrier (CC0) and a second component carrier (CC1)) to the same UE in order to support wider transmission bandwidths (i.e., to increase uplink data throughput to the base station). The assignment of component carriers to the UE can depend on an uplink buffer status (i.e., an uplink Buffer Status Report (BSR)) that can be sent from the UE to the base station (e.g., the uplink carrier aggregation activation for a UE is processed based on the UE's BSR in the base station). The BSR control element can provide information about the amount of data available for transmission at the UE (i.e., the buffered data to be sent from the UE to the base station). In case the received BSR value exceeds a BSR threshold, the base station can decide whether to increase uplink data throughput (i.e., it can decide whether to enable uplink carrier aggregation for the UE). In this case, the base station may verify that the power available at the UE is sufficient to activate carrier aggregation in the uplink direction (i.e., that the terminal has sufficient transmit power to send data over a first carrier component and a second carrier component). This information is sent to the base station in the form of a Power Headroom Report (PHR). The PHR control element can provide the base station (e.g., an eNB or a gNB) with information about the difference between the UE's nominal maximum transmit power and the estimated power for transmission on the shared uplink channel (UL-SCH). In case the PHR value exceeds a power threshold, the base station activates uplink carrier aggregation (e.g., assign a second component carrier to the UE). In accordance with example embodiments, the PHR comparison is with respect to a variable power threshold (i.e., based on a variable offset value) that considers BLER.

Figure 2:
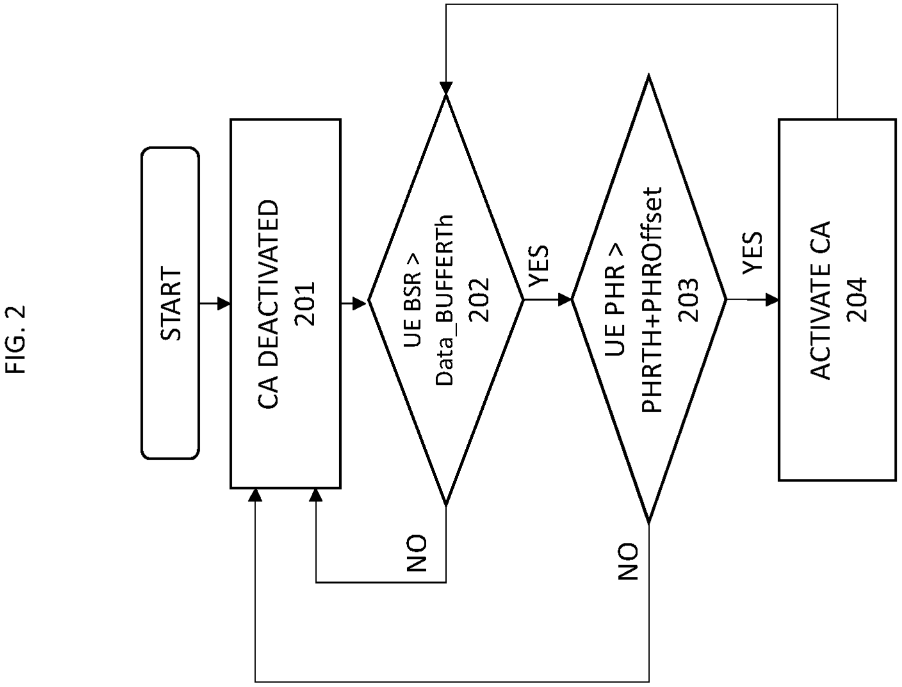
FIG. 2 illustrates a flowchart of a method for optimizing an uplink carrier aggregation in accordance with one embodiment.

FIG. 2 illustrates a flowchart of a method for optimizing an uplink carrier aggregation in accordance with one or more embodiments. Referring to FIG. 2, at operation 201, uplink carrier aggregation is disabled by default at the beginning of the uplink carrier aggregation process (i.e., only a single uplink carrier is assigned to a UE).

In operation 202, a base station performs a first threshold comparison to decide whether uplink carrier aggregation should be activated for a UE. Specifically, the base station (e.g., gNB or eNB) performs the first threshold comparison based on the amount of data available for transmission according to the BSR (i.e., the buffered data to be sent from the UE to the base station) and a BSR threshold (i.e., a data buffer threshold). Here, the BSR threshold, for example, can be a predetermined threshold. The base station determines whether the UE BSR is greater than the BSR threshold (Data_BufferTh).

If the base station determines that UE BSR is not greater than the BSR threshold (NO at operation 202), then the CA remains deactivated (or is deactivated in the case that the CA was activated in a prior iteration of the method).

If the base station determines that the amount of data available for transmission (i.e., UE BSR) exceeds the BSR threshold (YES at operation 202), the method proceeds to operation 203. In operation 203, the base station performs a second threshold comparison to decide whether to activate uplink carrier aggregation for the UE (or whether to maintain activation or to deactivate the CA in the case that the CA was activated in a prior iteration of the method). In an example embodiment, the base station performs the second threshold comparison based on the information in the Power Headroom Report (PHR) (i.e., the power available to the UE) and a variable power threshold. The variable power threshold includes a variable PHR offset value (i.e., a PHROffset). The power threshold may include a sum of a constant power threshold (i.e., PHRTh) and a variable PHR offset value (i.e., PHROffset). The constant power threshold (i.e., PHRTh) may be a predetermined value. The PHR offset may have an initial default value (e.g., zero), that varies based on BLER, as will be described in further detail below with reference to FIG. 4. The second threshold comparison determines whether the UE PHR is greater than the sum of the constant power threshold (PHRTh) and the variable PHR offset value (PHROffset).

If the base station determines that UE PHR is not greater than the power threshold, i.e., PHRTh+PHROffset (NO at operation 203), then the CA remains deactivated (or is deactivated in the case that the CA was activated in a prior iteration of the method).

Conversely, if the base station determines that the power available to the UE (PHR) exceeds the power threshold (YES at operation 203), then the base station activates uplink carrier aggregation for the UE at operation 204. According to an embodiment, once CA is activated, the base station repeatedly (e.g., periodically or continuously) performs the first and second threshold comparisons to determine whether to deactivate the CA or to maintain the activated CA. That is, the method returns to operation 202.

Similarly, if the CA is deactivated, the base station repeatedly (e.g., periodically or continuously) performs the first and second threshold comparisons.

While in the present example embodiment, performance of the second threshold comparison (operation 203) is contingent on the first threshold comparison (YES at operation 202), it is understood that one or more other embodiments are not limited thereto. For example, in one or more other embodiments, the second threshold comparison may precede the first threshold comparison, the first threshold comparison may be performed contingent on the second threshold comparison, the first and second threshold comparisons may be performed in parallel (e.g., simultaneously or with at least some temporal overlap), etc.

As set forth above, upon enabling (or maintaining) the uplink carrier aggregation for the UE and while the carrier aggregation is activated, the base station repeatedly (e.g., periodically, continuously, event-driven, etc.) determines whether the uplink data to be sent by the UE exceeds the first threshold (i.e., the BSR threshold) in operation 202 and determines whether the available power at the UE exceeds the second threshold (i.e., the variable PHR threshold) in order to determine whether to deactivate or maintain the carrier aggregation. According to another embodiment, if the uplink carrier aggregation is activated, then the base station may repeatedly perform only the second threshold comparison.

Further, as set forth above, if the CA is deactivated (e.g., NO at operation 202 or NO at operation 203, the base station repeatedly (e.g., periodically or continuously) performs the first and second threshold comparisons. However, it is understood that one or more other embodiments are not limited thereto. For example, according to another embodiment, if it is determined that the UE BSR is greater than the BSR threshold (YES at operation 202) but the UE PHR is not greater than the power threshold (NO at operation 203), then only the second threshold comparison may be repeatedly performed or only the second threshold comparison may be repeatedly performed for a predetermined period of time (or until another BSR for the UE is obtained), after which both the first and second threshold comparisons are performed.

In FIG. 2, while the base station repeatedly (e.g., periodically or event-driven) performs the threshold comparisons as set forth above in operation 202 and operation 203, respectively, the second threshold (i.e., the variable power threshold, and in particular, PHROffset) of the UE is updated throughout a session (e.g., the PHROffset is updated and stored in the base station throughout a session). That is, the PHROffset value does not revert to a default value during the session, but continues to update (described in further detail below with reference to FIG. 4).

Figure 3:
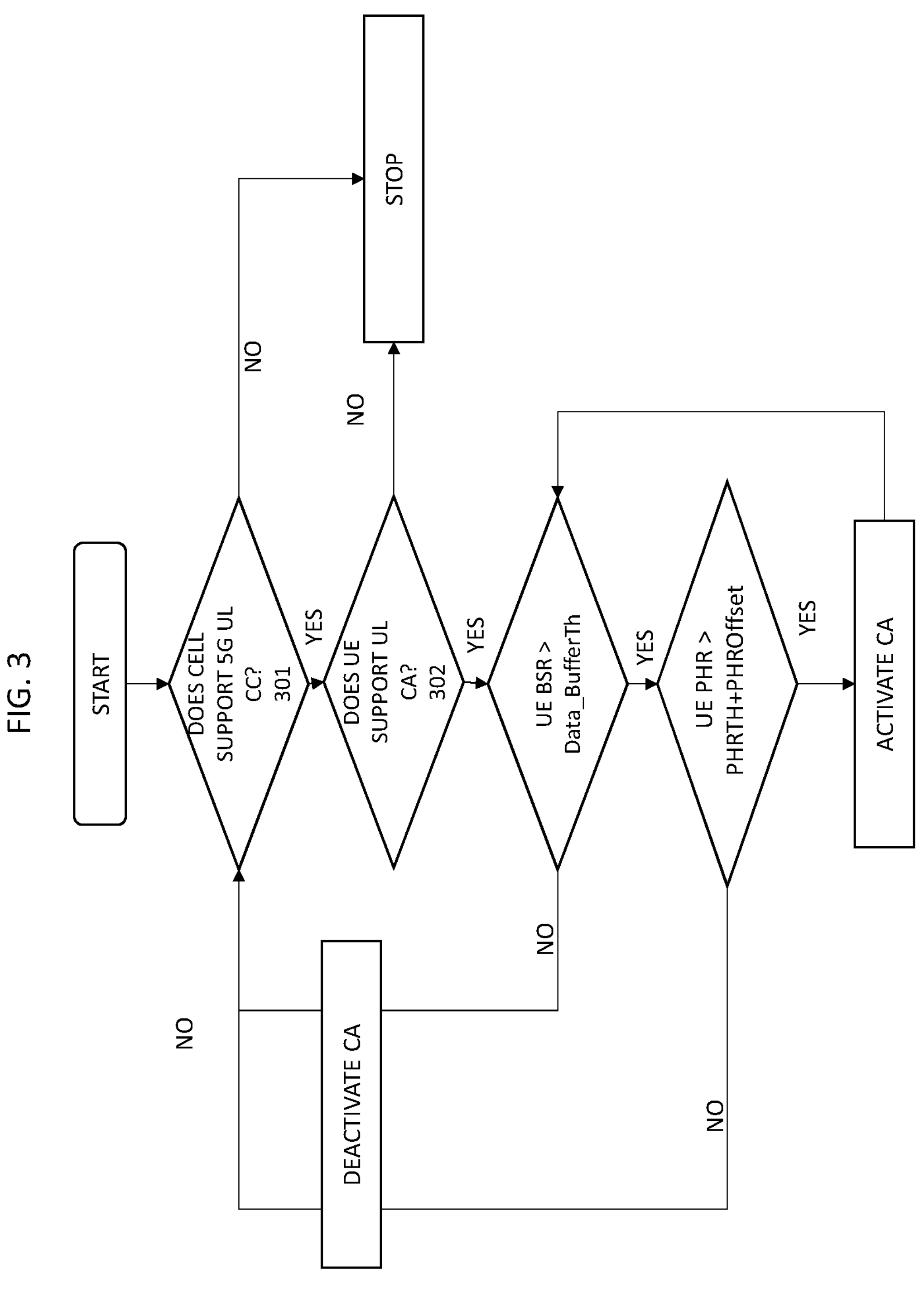
FIG. 3 illustrates a flowchart of a method for optimizing an uplink carrier aggregation in accordance with another embodiment.

FIG. 3 illustrates a flowchart of a method for optimizing an uplink carrier aggregation in accordance with another embodiment. Referring to FIG. 3, in addition to the operations 201 to 204 as set forth in FIG. 2, the embodiment of FIG. 3 additionally includes operations 301 and 302. In operation 301, the base station determines whether it supports 5G uplink carrier aggregation or not (i.e., whether the base station can assign 5G component carriers to the UE). In case the base station cannot support 5G uplink carrier aggregation the method ends.

In operation 302, the base station determines whether the UE supports uplink carrier aggregation (e.g., based on capability information received from the UE). In case the UE indicates that it supports uplink carrier aggregation, the uplink carrier aggregation process can begin as set forth in FIG. 2. Otherwise, the method ends.

Still referring to FIG. 3, in an example embodiment, operations 301 and 302 can be performed conditionally or independently, may be performed in any order, or may be performed in parallel (e.g., simultaneously or with at least some temporal overlap). Further, in another embodiment, either one of operations 301 and 302 may be omitted.

Figure 4:
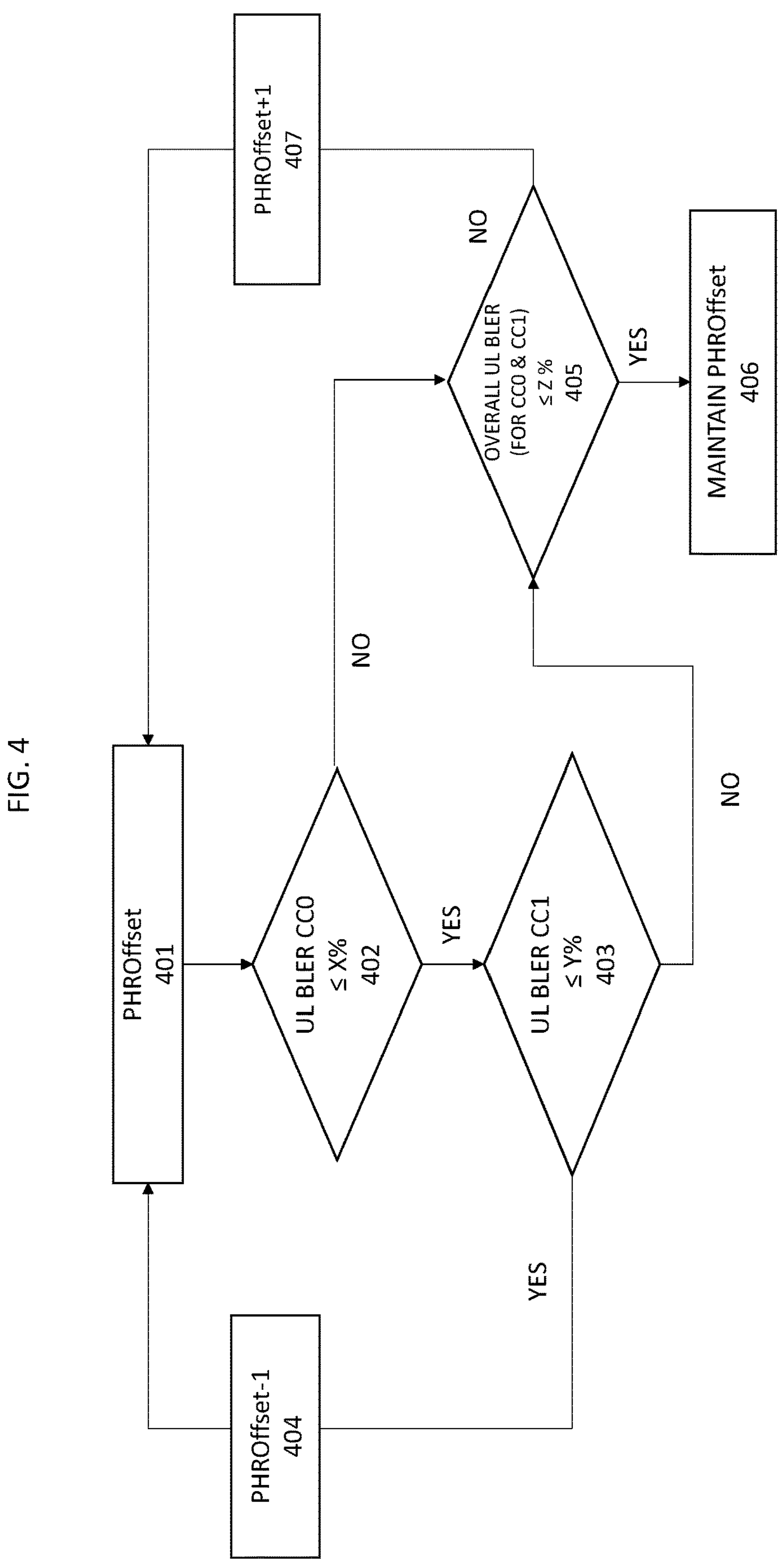
FIG. 4 illustrates a flowchart of a method for modifying a variable PHR offset value in accordance with one embodiment.

FIG. 4 illustrates a flowchart of a method for modifying a variable PHR offset value in accordance with one or more embodiments. The method of FIG. 4 may be repeatedly (e.g., continuously, periodically, etc.) performed whenever uplink carrier aggregation is activated for a UE. As will be described below, the base station (e.g., eNB, gNB, etc.) determines whether to modify the variable offset value (i.e., the PHROffset) based on a first block error rate (BLER) for a first uplink carrier (e.g., CC0) of the activated uplink carrier aggregation and based a second block error rate (BLER) for a second uplink carrier (e.g., CC1) of the activated uplink carrier aggregation. To this end, for every block of data payload received via the first uplink carrier, the UE sends an acknowledgment (ACK) for blocks successfully decoded and sends a negative acknowledgment (NACK) for blocks failing cyclic redundancy check (CRC) to the base station (i.e., the BLER is the ratio of number of blocks failing CRC to the total number of blocks transmitted to the base station).

Referring to FIG. 4, in operation 401, the PHR offset value is obtained. Here, when the base station activates the carrier aggregation for the first time (e.g., in a communication session with the UE), the variable offset value (i.e., the PHROffset) may be set or initialized to a predetermined value (e.g., 0 dB). Accordingly, a modification of the variable offset value (i.e., the PHROffset) may start from a predetermined value (e.g., 0 dB) and continuously be updated throughout the session.

In operation 402, the base station determines the first block error rate (BLER) and evaluates the first BLER using a third threshold comparison. In this third threshold comparison, the base station compares the first BLER with a predetermined threshold X. X denotes, for example, the upper limit for the first BLER (i.e., a first BLER threshold). If the first BLER is less than or equal to the first BLER threshold (i.e., the first BLER can be considered sufficiently low), the method proceeds to operation 403.

In operation 403, the base station determines a second BLER of a second uplink carrier and, in a fourth threshold comparison, compares the second BLER with a predetermined threshold Y. Y denotes, for example, the upper limit for the second BLER (i.e., a second BLER threshold). According to various embodiments, X and Y may be equal, X may be greater than Y, or Y may be greater than X. If the second BLER is less than or equal to the second BLER threshold (i.e., the second BLER can be considered sufficiently low), the method proceeds to operation 404.

In operation 404, the base station reduces the variable offset value incrementally (e.g., by 1 dB increments). As a result, the variable power threshold in FIG. 2 (i.e., PHRTh+PHROffset) is reduced. Accordingly, a reduction of the variable power threshold lowers the threshold level of the second threshold comparison (i.e., the PHR threshold comparison) in operation 203 of FIG. 2.

To this end, while determining whether to deactivate the uplink carrier aggregation, the lower threshold level in operation 203 of FIG. 2 adapts to current communication conditions (i.e., BLER) to thereby stabilize and optimize the uplink carrier aggregation algorithm. By adapting the power threshold to current BLER, the uplink carrier aggregation algorithm has the advantage that the data throughput in the uplink is maximized under variable conditions and the uplink transmit operation in the UE is more energy-efficient.

Still referring to FIG. 4, if the first BLER is greater than the first BLER threshold (NO in operation 402) or if the second BLER is greater than the second BLER threshold (NO in operation 403), the base station subsequently determines whether an overall BLER is less than or equal to an overall BLER threshold Z in operation 405 (i.e., fifth threshold comparison).

Z denotes, for example, the upper limit for the overall BLER of the first carrier and the second carrier (i.e., an overall BLER threshold). In an example embodiment, the overall BLER may be a sum of a first BLER and a second BLER. According to another example embodiment, the overall BLER may be a mean value of the first BLER and the second BLER. In an example embodiment, since the BLER by definition is a positive value, the overall BLER may be a geometric mean value of the first BLER and the second BLER. The geometric mean value has the advantage that it puts relatively more weight on small observations (i.e., small values). The overall BLER threshold may be a predetermined value or calculated from the first BLER threshold and the second BLER threshold.

If the base station determines that the overall BLER is less than or equal the overall BLER threshold (YES at operation 405), the PHR offset is maintained at operation 406.

If the base station determines that the overall BLER exceeds the overall BLER threshold (NO at operation 405), the base station incrementally increases the variable offset value (i.e., PHROffset) by a predetermined increment (e.g., 1 dB) at operation 407. As a result, the variable power threshold in FIG. 2 (e.g., PHRTh+PHROffset) is increased, thereby raising the threshold level of the second threshold comparison (i.e., the power threshold comparison) in operation 203 of FIG. 2. To this end, while determining whether to deactivate the uplink carrier aggregation, the higher threshold level in operation 203 of FIG. 2 will more likely deactivate the carrier aggregation thereby making more power available to the UE to reduce BLER.

According to example embodiments, the power threshold for determining whether to deactivate carrier aggregation considers BLER. As a result, where BLER is sufficiently low, the carrier aggregation state may extend longer due to a reduced power threshold, thereby improving data throughput and energy efficiency. Conversely, where BLER is high, the carrier aggregation is deactivated to free up power at the UE, thereby reducing BLER and improving transmission quality.

Figure 5:
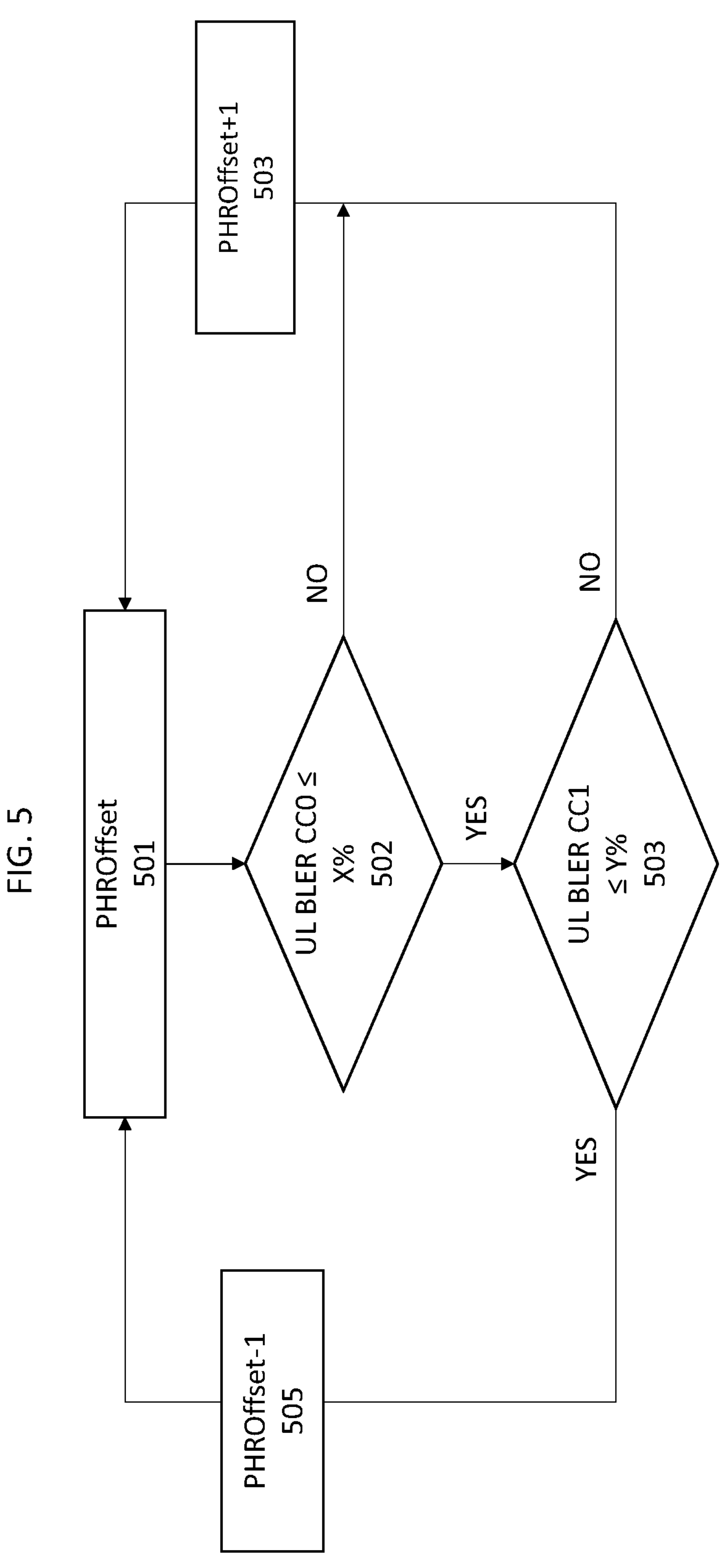
FIG. 5 illustrates a flowchart of a method for modifying a variable PHR offset value in accordance with another embodiment.

FIG. 5 illustrates a flowchart of a method for modifying a variable PHR offset value in accordance with another embodiment. The method of FIG. 5 may be repeatedly (e.g., continuously, periodically, etc.) performed whenever uplink carrier aggregation is activated for a UE.

Referring to FIG. 5, in operation 501, the PHR offset value is obtained (similar to operation 401 of FIG. 4).

In operation 502, (similar to operation 402 of FIG. 4) the base station determines whether the first BLER is less than or equal to the first BLER threshold. If the base station determines that the first BLER exceeds the first BLER threshold (NO in operation 502), the method proceeds to operation 503.

In operation 503, the base station increases the variable offset value incrementally (e.g., by 1 dB increments).

If the base station determines that the first BLER is less than or equal to the first BLER threshold (YES in operation 502), the method proceeds to operation 504.

In operation 504, the base station determines whether the second BLER is less than or equal to the second BLER threshold. If the base station determines that the second BLER exceeds the second BLER threshold (NO in operation 504), the method proceeds to operation 503. If the base station determines that the second BLER is less than or equal to the second BLER threshold (YES in operation 504), the method proceeds to operation 505.

In operation 505, the base station reduces the variable offset value incrementally (e.g., by 1 dB increments)

Figure 6:
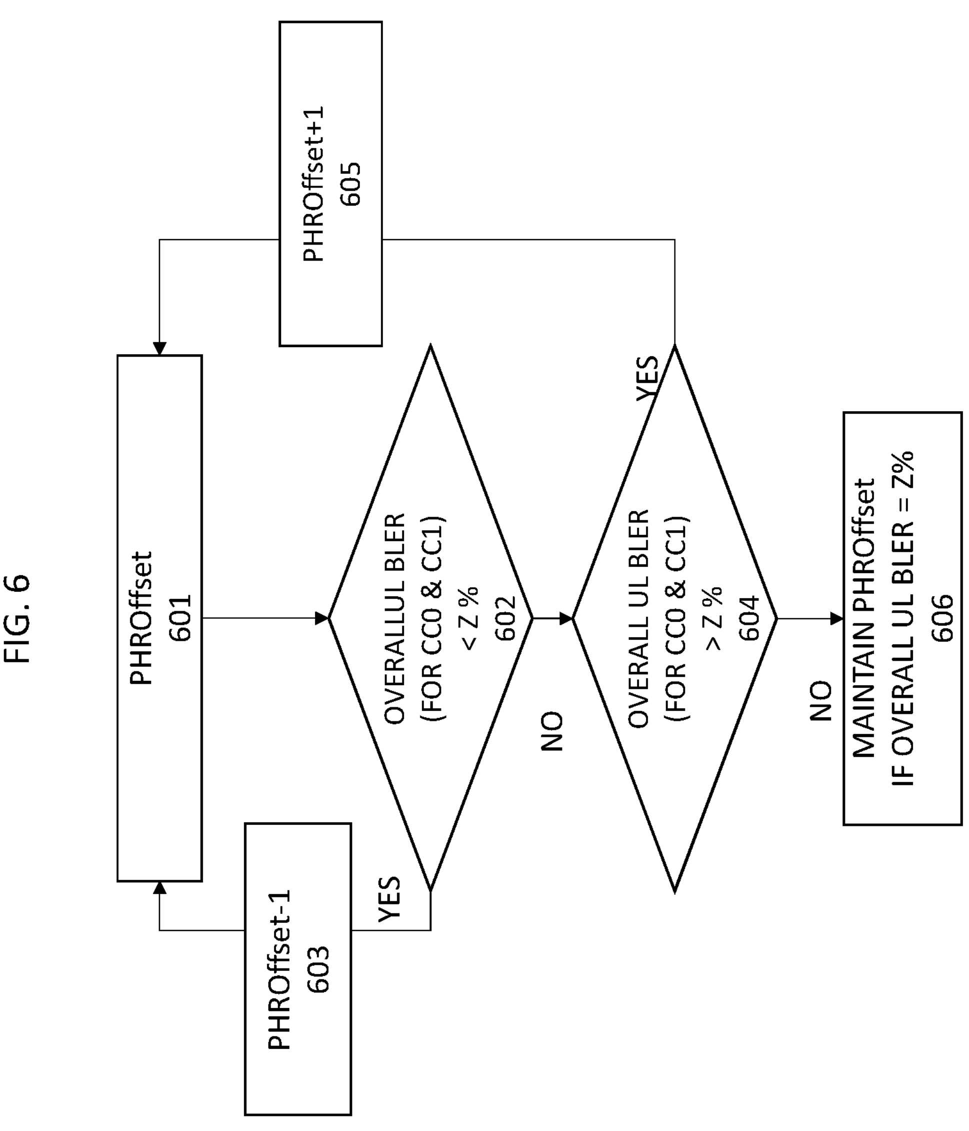
FIG. 6 illustrates a flowchart of modifying a variable PHR offset value in accordance with another embodiment.

FIG. 6 illustrates a flowchart of modifying a variable PHR offset value in accordance with another embodiment. The method of FIG. 6 may be repeatedly (e.g., continuously, periodically, etc.) performed whenever uplink carrier aggregation is activated for a UE.

Referring to FIG. 6, in operation 601, the PHR offset value is obtained (similar to operation 401 of FIG. 4).

In operation 602, the base station determines whether the overall BLER (e.g., a sum of a first BLER and a second BLER) is less than the overall BLER threshold. If the base station determines that the overall BLER is less than the overall BLER threshold (YES in operation 602), the method proceeds to operation 603.

In operation 603, the base station reduces the variable offset value incrementally (e.g., by 1 dB increments).

If the base station determines that the overall BLER is greater than the overall BLER threshold (NO in operation 602), the method proceeds to operation 604.

In operation 604, if the base station determines that the overall BLER is greater than the overall BLER threshold (YES in operation 604), the method proceeds to operation 605.

In operation 605, the base station increases the variable offset value incrementally (e.g., by 1 dB increments).

Moreover, if the base station determines that the overall BLER is equal to the overall BLER threshold (NO in operation 604), the method proceeds to operation 606. In operation 606, the base station maintains the variable offset value unchanged.

Figure 7:
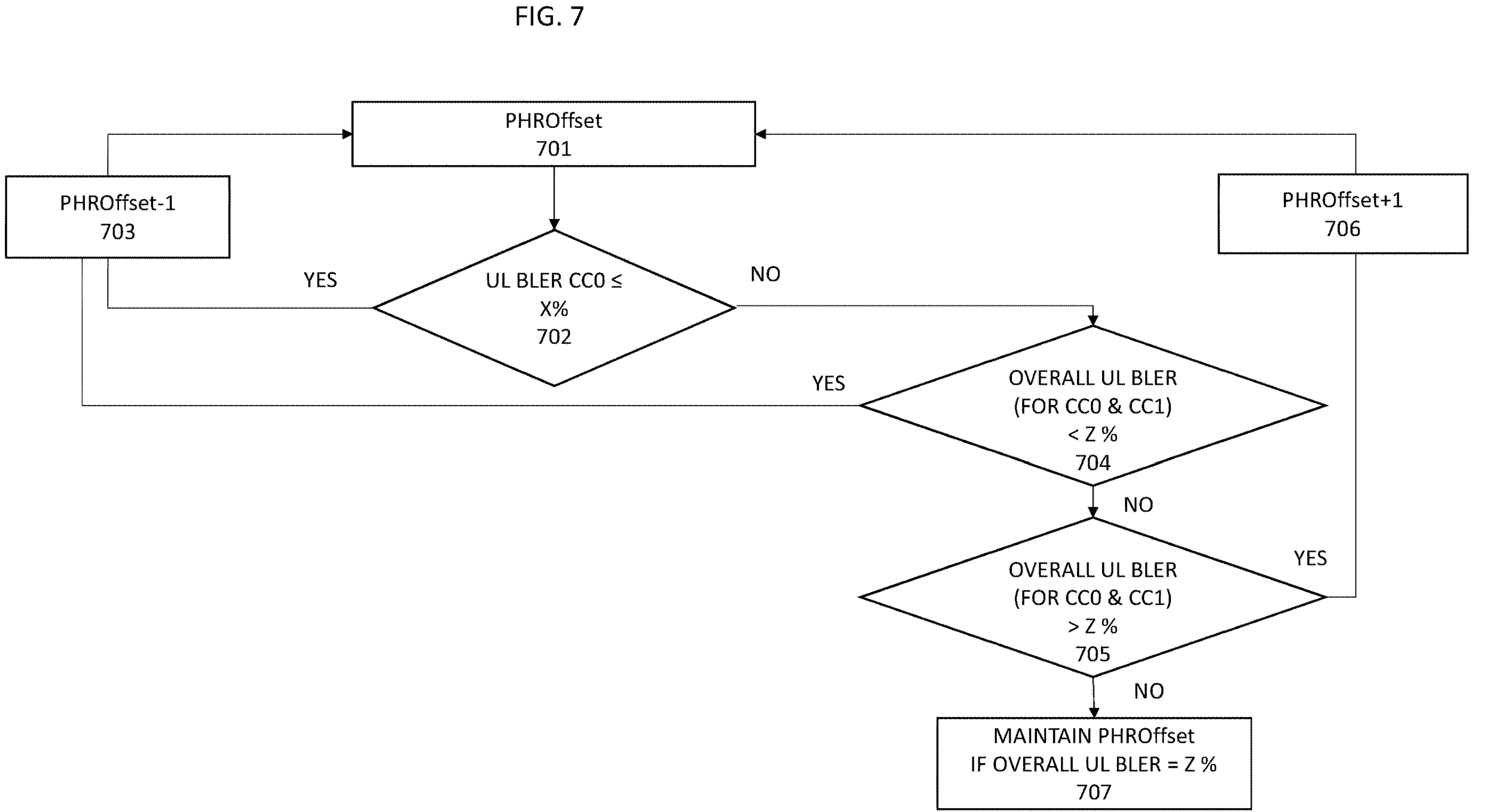
FIG. 7 illustrates a flowchart of modifying a variable PHR offset value in accordance with another embodiment.

FIG. 7 illustrates a flowchart of modifying a variable PHR offset value in accordance with another embodiment. The method of FIG. 7 may be repeatedly (e.g., continuously, periodically, etc.) performed whenever uplink carrier aggregation is activated for a UE.

Referring to FIG. 7, in operation 701, the PHR offset value is obtained (similar to operation 401 of FIG. 4).

In operation 702, the base station determines whether the first BLER is less than or equal to the first BLER threshold. If the base station determines that the first BLER is less than or equal to the first BLER threshold (YES in operation 702), the method proceeds to operation 703.

In operation 703, the base station reduces the variable offset value incrementally (e.g., by 1 dB increments).

If the first BLER is greater than the first BLER threshold (NO in operation 702), the method proceeds to operation 704.

In operation 704, the base station determines whether the overall BLER is less than the overall BLER threshold. If the base station determines that the overall BLER is less than the overall BLER threshold (YES in operation 704), the method proceeds to operation 703 and the base station reduces the variable offset value incrementally (e.g., by 1 dB increments). If the base station determines that the overall BLER is greater than the overall BLER threshold (NO in operation 704), the method proceeds to operation 705.

In operation 705, the base station determines whether the overall BLER is greater than the overall BLER threshold. If the base station determines that the overall BLER is greater than the overall BLER threshold (YES in operation 705), the method proceeds to operation 706.

In operation 706, the base station increases the variable offset value incrementally (e.g., by 1 dB increments).

Moreover, if the base station determines that the overall BLER is equal to the overall BLER threshold (NO in operation 705), the method proceeds to operation 707. In operation 707, the base station maintains the variable offset value unchanged.

Figure 8:
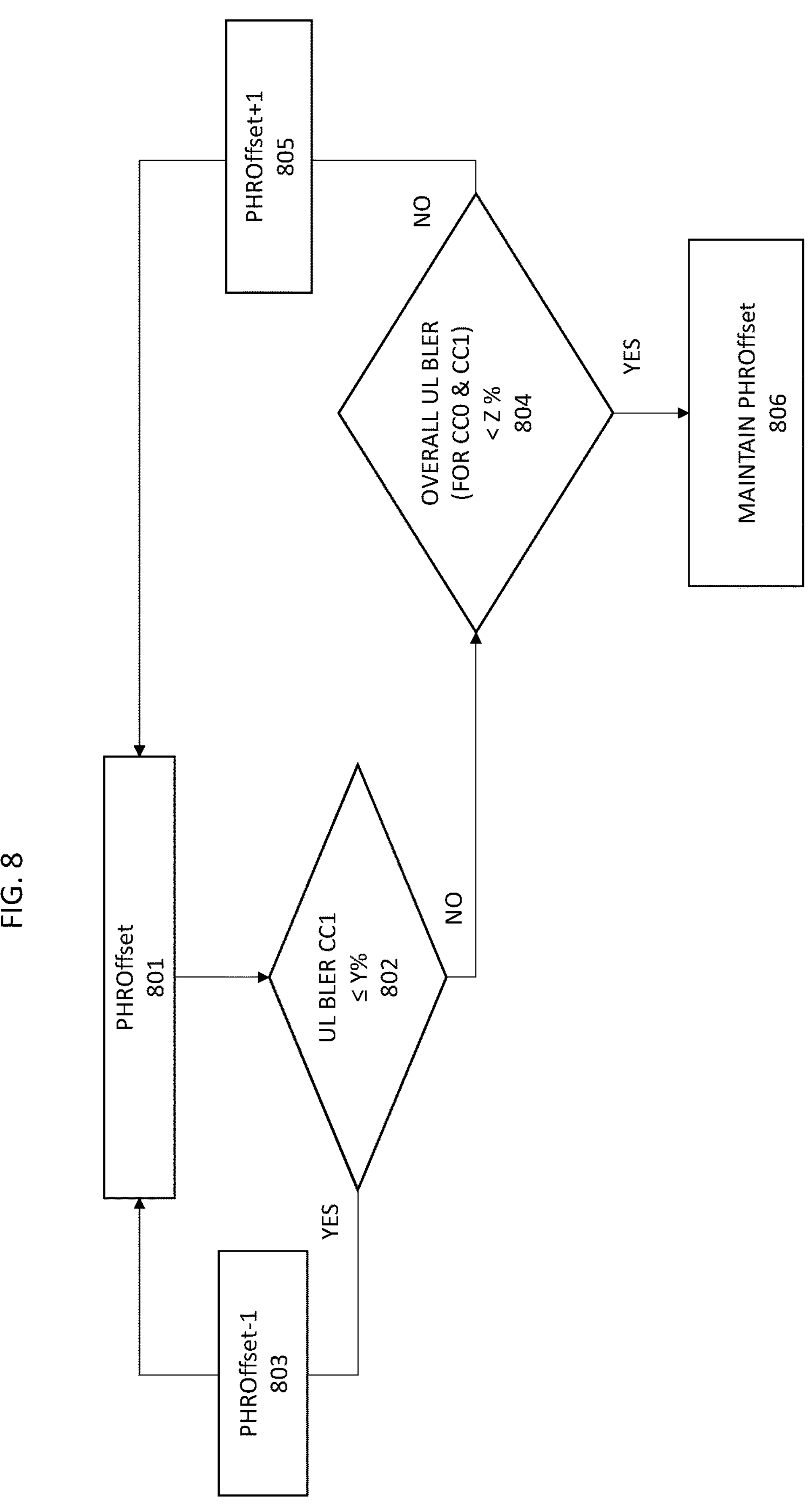
FIG. 8 illustrates a flowchart of modifying a variable PHR offset value in accordance with another embodiment.

FIG. 8 illustrates a flowchart of modifying a variable PHR offset value in accordance with another embodiment. The method of FIG. 8 may be repeatedly (e.g., continuously, periodically, etc.) performed whenever uplink carrier aggregation is activated for a UE. Referring to FIG. 8, in operation 801, the PHR offset value is obtained (similar to operation 401 of FIG. 4).

In operation 802, the base station determines whether the first BLER is less than or equal to the first BLER threshold. If the base station determines that the first BLER is less than or equal to the first BLER threshold (YES in operation 802), the method proceeds to operation 803.

In operation 803, the base station reduces the variable offset value incrementally (e.g., by 1 dB increments).

If the first BLER is greater than the first BLER threshold (NO in operation 802), the method proceeds to operation 804.

In operation 804, the base station determines whether the overall BLER is less than the overall BLER threshold. If the base station determines that the overall BLER is greater than the overall BLER threshold (NO in operation 704), the method proceeds to operation 805.

In operation 805, and the base station increases the variable offset value incrementally (e.g., by 1 dB increments).

If the base station determines that the overall BLER is less than the overall BLER threshold (YES in operation 804), the method proceeds to operation 806.

In operation 806, the base station maintains the variable offset value unchanged. According to example embodiments of the disclosure, the apparatuses, methods and a non-transitory computer readable storage media provide for a determination whether to activate or deactivate an uplink carrier aggregation in a radio access network to based variable offset value which adaptively modifies the threshold level for the determination. As a result, a stable and energy-efficient application of uplink carrier aggregation and a high uplink data throughput can be achieved.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. An apparatus for optimizing an uplink carrier aggregation in a radio access network (RAN), the apparatus comprising:

a memory storing instructions, and at least one processor configured to execute the instructions to:

determine whether uplink data to be sent by a user equipment exceeds a first threshold;

determine whether an available power at the user equipment exceeds a second threshold, wherein the second threshold is dynamically modified and determined based on a variable offset value that is dynamically modified during a current communication session with the user equipment based on current communication conditions determined during the current communication session, and wherein the available power is an available transmit power at the user equipment; and activate uplink carrier aggregation for the user equipment based on the uplink data to be sent being determined to exceed the first threshold and the power available at the user equipment being determined to exceed the second threshold.

2. The apparatus as claimed in claim 1, wherein the at least one processor is further configured to execute the instructions to:

determine whether to modify the variable offset value based on a first block error rate (BLER) for a first uplink carrier of the activated uplink carrier aggregation and a second block error rate (BLER) for a second uplink carrier of the activated uplink carrier aggregation, wherein the second threshold is a sum of a predetermined fixed value and the variable offset value.

3. The apparatus as claimed in claim 2, wherein the at least one processor is further configured to execute the instructions to:

determine whether the first BLER is less than or equal to a first BLER threshold;

determine whether the second BLER is less than or equal to a second BLER threshold; and decrease the variable offset value based on the first BLER being determined to be less than or equal to the first BLER threshold and the second BLER being determined to be less than or equal to the second BLER threshold.

4. The apparatus as claimed in claim 3, wherein the at least one processor is further configured to execute the instructions to:

determine whether a combination of the first BLER and the second BLER is less than or equal to a third BLER threshold; and based on at least one of the first BLER being determined to be greater than the first BLER threshold or the second BLER being determined to be greater than the second BLER threshold, and based on the combination being determined to be less than or equal to the third BLER threshold, maintain the variable offset value.

5. The apparatus as claimed in claim 4, wherein the at least one processor is further configured to execute the instructions to:

based on the at least one of the first BLER being determined to be greater than the first BLER threshold or the second BLER being determined to be greater than the second BLER threshold, and based on the combination being determined to be greater than the third BLER threshold, increase the variable offset value.

6. The apparatus as claimed in claim 2, wherein the at least one processor is further configured to execute the instructions to:

repeatedly determine whether to modify the variable offset value while the carrier aggregation is activated.

7. The apparatus as claimed in claim 1, wherein the at least one processor is further configured to execute the instructions to:

repeatedly determine whether the uplink data to be sent by the user equipment exceeds the first threshold and whether the available power at the user equipment exceeds the second threshold are repeatedly performed while the carrier aggregation is activated, in order to determine whether to deactivate the carrier aggregation; and repeatedly determine whether the uplink data to be sent by the user equipment exceeds the first threshold and whether the available power at the user equipment exceeds the second threshold are repeatedly performed while the carrier aggregation is deactivated, in order to determine whether to activate the carrier aggregation.

8. A method for optimizing an uplink carrier aggregation in a radio access network (RAN), the method comprising:

determining whether uplink data to be sent by a user equipment exceeds a first threshold;

determining whether an available power at the user equipment exceeds a second threshold, wherein the second threshold is dynamically modified and determined based on a variable offset value that is dynamically modified during a current communication session with the user equipment based on current communication conditions determined during the current communication session, and wherein the available power is an available transmit power at the user equipment; and activating uplink carrier aggregation for the user equipment based on the uplink data to be sent being determined to exceed the first threshold and the power available at the user equipment being determined to exceed the second threshold.

9. The method as claimed in claim 1, further comprising:

determining whether to modify the variable offset value based on a first block error rate (BLER) for a first uplink carrier of the activated uplink carrier aggregation and a second block error rate (BLER) for a second uplink carrier of the activated uplink carrier aggregation, wherein the second threshold is a sum of a predetermined fixed value and the variable offset value.

10. The method as claimed in claim 9, wherein the determining whether to modify the variable offset value comprises:

determining whether the first BLER is less than or equal to a first BLER threshold;

determining whether the second BLER is less than or equal to a second BLER threshold; and decreasing the variable offset value based on the first BLER being determined to be less than or equal to the first BLER threshold and the second BLER being determined to be less than or equal to the second BLER threshold.

11. The method as claimed in claim 10, wherein the determining whether to modify the variable offset value further comprises:

determining whether a combination of the first BLER and the second BLER is less than or equal to a third BLER threshold; and based on at least one of the first BLER being determined to be greater than the first BLER threshold or the second BLER being determined to be greater than the second BLER threshold, and based on the combination being determined to be less than or equal to the third BLER threshold, maintaining the variable offset value.

12. The method as claimed in claim 11, wherein the determining whether to modify the variable offset value further comprises:

based on the at least one of the first BLER being determined to be greater than the first BLER threshold or the second BLER being determined to be greater than the second BLER threshold, and based on the combination being determined to be greater than the third BLER threshold, increasing the variable offset value.

13. The method as claimed in claim 9, wherein the determining whether to modify the variable offset value is repeatedly performed while the carrier aggregation is activated.

14. The method as claimed in claim 8, wherein:

the determining whether the uplink data to be sent by the user equipment exceeds the first threshold and the determining whether the available power at the user equipment exceeds the second threshold are repeatedly performed while the carrier aggregation is activated, in order to determine whether to deactivate the carrier aggregation; and the determining whether the uplink data to be sent by the user equipment exceeds the first threshold and the determining whether the available power at the user equipment exceeds the second threshold are repeatedly performed while the carrier aggregation is deactivated, in order to determine whether to activate the carrier aggregation.

15. A non-transitory computer readable recording medium having recorded thereon instructions executable by at least one processor to perform a method for optimizing an uplink carrier aggregation in a radio access network (RAN), the method comprising:

determining whether uplink data to be sent by a user equipment exceeds a first threshold;

determining whether an available power at the user equipment exceeds a second threshold, wherein the second threshold is dynamically modified and determined based on a variable offset value that is dynamically modified during a current communication session with the user equipment based on current communication conditions determined during the current communication session, and wherein the available power is an available transmit power at the user equipment; and activating uplink carrier aggregation for the user equipment based on the uplink data to be sent being determined to exceed the first threshold and the power available at the user equipment being determined to exceed the second threshold.

16. The non-transitory computer readable recording medium as claimed in claim 15, further comprising:

determining whether to modify the variable offset value based on a first block error rate (BLER) for a first uplink carrier of the activated uplink carrier aggregation and a second block error rate (BLER) for a second uplink carrier of the activated uplink carrier aggregation, wherein the second threshold is a sum of a predetermined fixed value and the variable offset value.

17. The non-transitory computer readable recording medium as claimed in claim 16, further comprising:

determining whether the first BLER is less than or equal to a first BLER threshold;

determining whether the second BLER is less than or equal to a second BLER threshold; and decreasing the variable offset value based on the first BLER being determined to be less than or equal to the first BLER threshold and the second BLER being determined to be less than or equal to the second BLER threshold.

18. The non-transitory computer readable recording medium as claimed in claim 17, wherein the determining whether to modify the variable offset value further comprises:

determining whether a combination of the first BLER and the second BLER is less than or equal to a third BLER threshold; and based on at least one of the first BLER being determined to be greater than the first BLER threshold or the second BLER being determined to be greater than the second BLER threshold, and based on the combination being determined to be less than or equal to the third BLER threshold, maintaining the variable offset value.

19. The non-transitory computer readable recording medium as claimed in claim 16, wherein the determining whether to modify the variable offset value is repeatedly performed while the carrier aggregation is activated.

20. The non-transitory computer readable recording medium as claimed in claim 15, wherein:

the determining whether the uplink data to be sent by the user equipment exceeds the first threshold and the determining whether the available power at the user equipment exceeds the second threshold are repeatedly performed while the carrier aggregation is activated, in order to determine whether to deactivate the carrier aggregation; and the determining whether the uplink data to be sent by the user equipment exceeds the first threshold and the determining whether the available power at the user equipment exceeds the second threshold are repeatedly performed while the carrier aggregation is deactivated, in order to determine whether to activate the carrier aggregation.

* * * * *